United States Patent
Liu et al.

(10) Patent No.: US 9,652,582 B1
(45) Date of Patent: May 16, 2017

(54) MULTI-INSTANTIATED BLOCK TIMING OPTIMIZATION

(71) Applicant: Cadence Design Systems, Inc., San Jose, CA (US)

(72) Inventors: Dongzi Liu, San Jose, CA (US); Pinhong Chen, Saratoga, CA (US); Deng Pan, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 15/013,577

(22) Filed: Feb. 2, 2016

(51) Int. Cl.
*G06F 17/50* (2006.01)
*G06F 9/455* (2006.01)

(52) U.S. Cl.
CPC ............... *G06F 17/5081* (2013.01)

(58) Field of Classification Search
CPC .................................. G06F 17/5081
USPC .................................... 716/113
See application file for complete search history.

(56) References Cited

U.S. PATENT DOCUMENTS

| | | | |
|---|---|---|---|
| 6,658,628 B1 * | 12/2003 | Landy | G06F 17/5045 716/103 |
| 8,839,171 B1 * | 9/2014 | Varadarajan | G06F 17/5045 716/113 |
| 2015/0026653 A1 * | 1/2015 | Stevens | G06F 17/505 716/108 |
| 2016/0103943 A1 * | 4/2016 | Xia | G06F 17/5081 716/108 |

* cited by examiner

*Primary Examiner* — Suresh Memula
(74) *Attorney, Agent, or Firm* — Schwegman Lundberg & Woessner, P.A.

(57) ABSTRACT

Electronic design automation systems and methods are presented for top-down timing budget flow in master-clone scenarios. In some embodiments, different instances of a master-clone block within an integrated circuit design are associated with different constraint files. The different constraint files are based on the different connections of each instance with elements of the integrated circuit design as well as the shared structure of the master-clone block. A top-down timing budget flow may then be generated based on the differing constraint files, and the integrated circuit design may be modified based on this analysis prior to generation of physical devices based on the design.

20 Claims, 9 Drawing Sheets

MULTI-INSTANTIATED BLOCK TIMING OPTIMIZATION

TECHNICAL FIELD

Embodiments described herein relate to electronic design automation (EDA), and to systems, methods, devices, and instructions for optimization of large circuit designs using master-clone blocks.

BACKGROUND

Electronic design automation (EDA) is a category of systems for assisting with the design of electronic systems and devices. Large, integrated circuit designs are often assembled from previously designed blocks. This enables reduced turnaround times for generation of an integrated circuit. Schematic and layout information for such block portions of a design may be exchanged or licensed as intellectual property.

Some circuits use parallel chip architectures where multiple instances of a design block are integrated into a single circuit die, or into multiple circuit dies in a single chip package. One example of a parallel architecture is a multi-core processor. A multi-core processor is a single computing component with two or more independent central processing units, which read and execute program instructions. When a single circuit includes multiple instances of the same design, one instance may be referred to as the master while additional instances may be referred to as clones.

BRIEF DESCRIPTION OF THE DRAWINGS

Various ones of the appended drawings merely illustrate example embodiments of the present disclosure and should not be considered as limiting its scope.

DETAILED DESCRIPTION

Example embodiments described herein relate to methods, computer media, and devices used for analyzing and optimizing circuit designs having multiple instances of a particular design block. While certain example embodiments are discussed, it will be apparent that other embodiments not specifically described herein, including embodiments using hierarchical timing analysis performed at any stage of a circuit design, are attainable within the scope of the innovations presented herein.

To ensure that a circuit design works as planned, a design team uses static timing analysis to determine if the various clocks and signals within a circuit design are correctly implemented. Incorrect implementation of timing may prevent a circuit from functioning. Flat analysis of timing within an integrated circuit uses analysis of every element and wire in the design. In a hierarchical approach, blocks of logic are grouped together within a circuit design. These blocks are then modeled as timing abstractions within the design. Embodiments described herein include timing analysis of circuit designs with multiple instances of the same block within a circuit design.

As described herein, a master-clone block or a multi-instantiated block refers to a portion of a circuit design that is repeated multiple times within an overall circuit design. Each instance of a master-clone block or multi-instantiated block includes the same structure, which is referred to herein as a master structure. Such instances of a master-clone block may be referred to herein as clones, clone instances, blocks having a shared master structure, or using other such descriptions. Each instance of a master-clone block may also include identical "pins," which are the input and output connections where an instance may be connected to other elements of a circuit design. Even though each instance of a master-clone block has the same internal structure copying the master structure, the timing constraints needed for different instances may not be the same, due to the impact of elements in the circuit design around each instance and connected to each instance (e.g., via pins of the instance). Embodiments presented herein relate to timing analysis and optimization for instances of a master-clone block using separate timing constraints for each instance. In some embodiments, as described below, separate Synopsys Design Constraint (SDC) files may be used for the separate timing constraints of each instance of a master-clone block.

Figure 1:
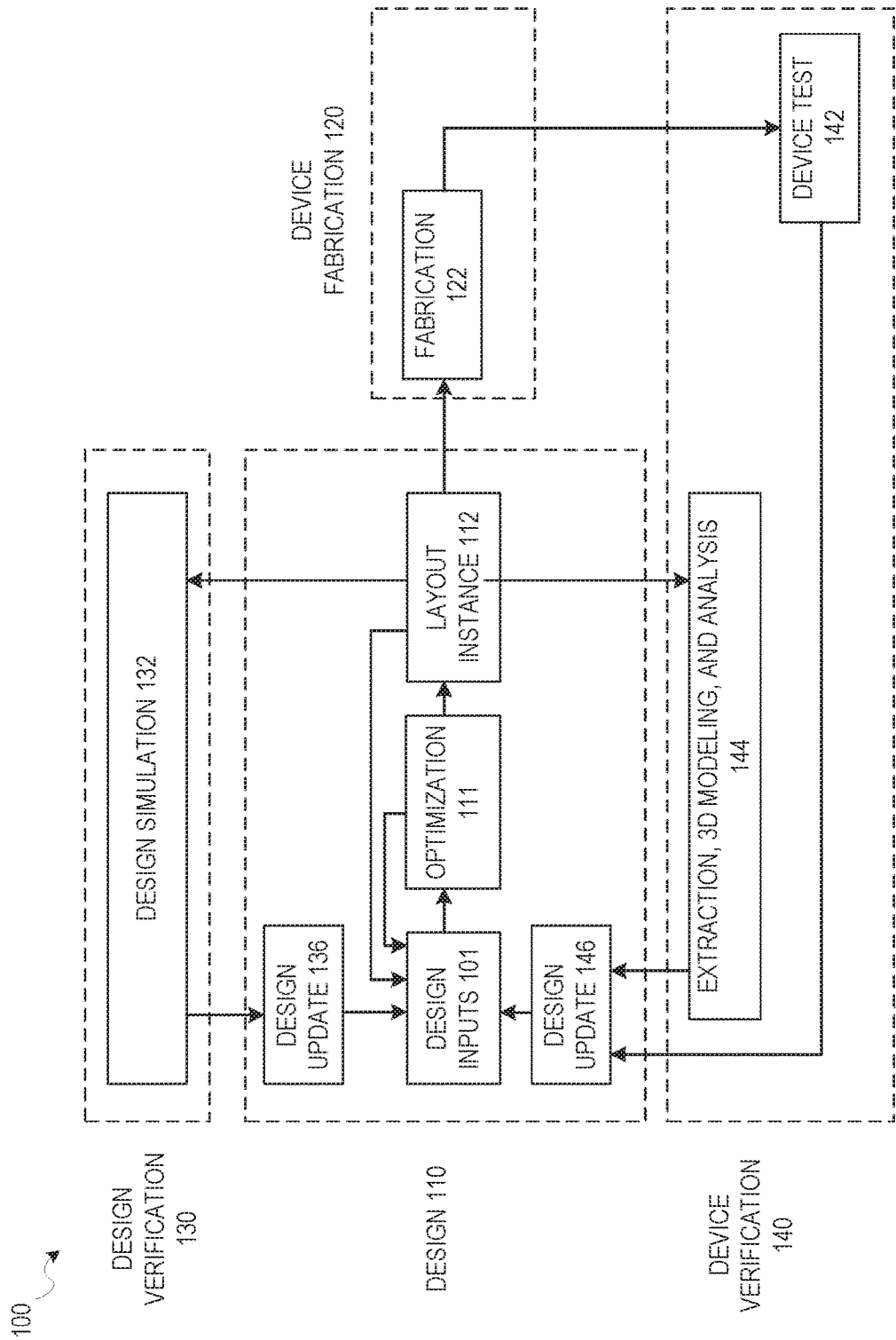
FIG. 1 is a diagram illustrating one possible design process flow for generating a circuit including embodiments to meet concurrent timing constraints for master-clone blocks using optimization.

FIG. 1 is a diagram illustrating one possible design process flow for generating a circuit including embodiments to meet concurrent timing constraints for master-clone blocks using optimization. This includes possible design process flows for generating a circuit using concurrent timing constraints for multi-instantiated blocks and associated optimization according to some example embodiments. It will be apparent that other design flow operations may function using the timing constraints and optimizations described herein, but design flow 100 is described here for the purposes of illustration. As illustrated, the overall design flow 100 includes a design phase 110, a device fabrication phase 120, a design verification phase 130, and a device verification phase 140. The design phase 110 involves an initial design input operation 101 where the basic elements and functionality of a device are determined, as well as revisions based on various analyses and optimization of a circuit design. This design input operation 101 is where instances of a master-clone block are used in the design and any additional circuitry is selected. The initial strategy, tactics, and context for the device to be created are also generated in the design input operation 101, depending on the particular design algorithm to be used.

In some embodiments, following an initial selection of design values in design input operation 101, timing analysis and optimization according to various embodiments occurs in an optimization operation 111, along with any other automated design processes. As described below, design constraints for blocks of a circuit design generated with design inputs in design input operation 101 may be analyzed using hierarchical timing analysis according to various embodiments. While design flow 100 shows such optimization occurring prior to layout instance 112, such hierarchical timing analysis and optimization may be performed at any time to verify operation of a circuit design. For example, in various embodiments, constraints for blocks in a circuit design may be generated prior to routing of connections in a circuit design, after routing, during register transfer level (RTL) operations, or as part of a final signoff optimization or verification prior to a device fabrication operation 122.

After design inputs are used in design input operation 101 to generate a circuit layout, and any optimization operations 111 are performed, a layout is generated in layout instance 112. The layout describes the physical layout dimensions of the device that match the design inputs. This layout may then be used in a fabrication operation 122 to generate a device, or additional testing and design updates may be performed using designer inputs or automated updates based on the design simulation 132 operations or 3D modeling and analysis 144 operations. Once the device is generated, the device can be tested as part of device test 142 operations, and layout modifications generated based on actual device performance.

As described in more detail below, design updates 136 from design simulation 132, design updates 146 from device test 142 or 3D modeling and analysis 144 operations, or direct design input operation 101 may occur after an initial layout instance 112 is generated. In various embodiments, whenever design inputs are used to update or change an aspect of a circuit design, a timing analysis and optimization operation 111 may be performed.

For example, in various embodiments a user may provide an input to an EDA computing device indicating placement of an instance of a master-clone block within a first portion of a circuit design. Once a design is ready, another input to the EDA computing device may be used to generate constraints for each instance of the master-clone block, and a timing analysis may be performed using the constraints. An output to a display of the EDA computing device may show results of the timing analysis, or may show optimizations recommended or automatically performed adjustments to the circuit design based on the timing analysis. Further inputs to the EDA computing device may involve adjustments as user design inputs, with additional timing analysis and optimization initiated via user operation of the EDA computing device.

Figure 2:
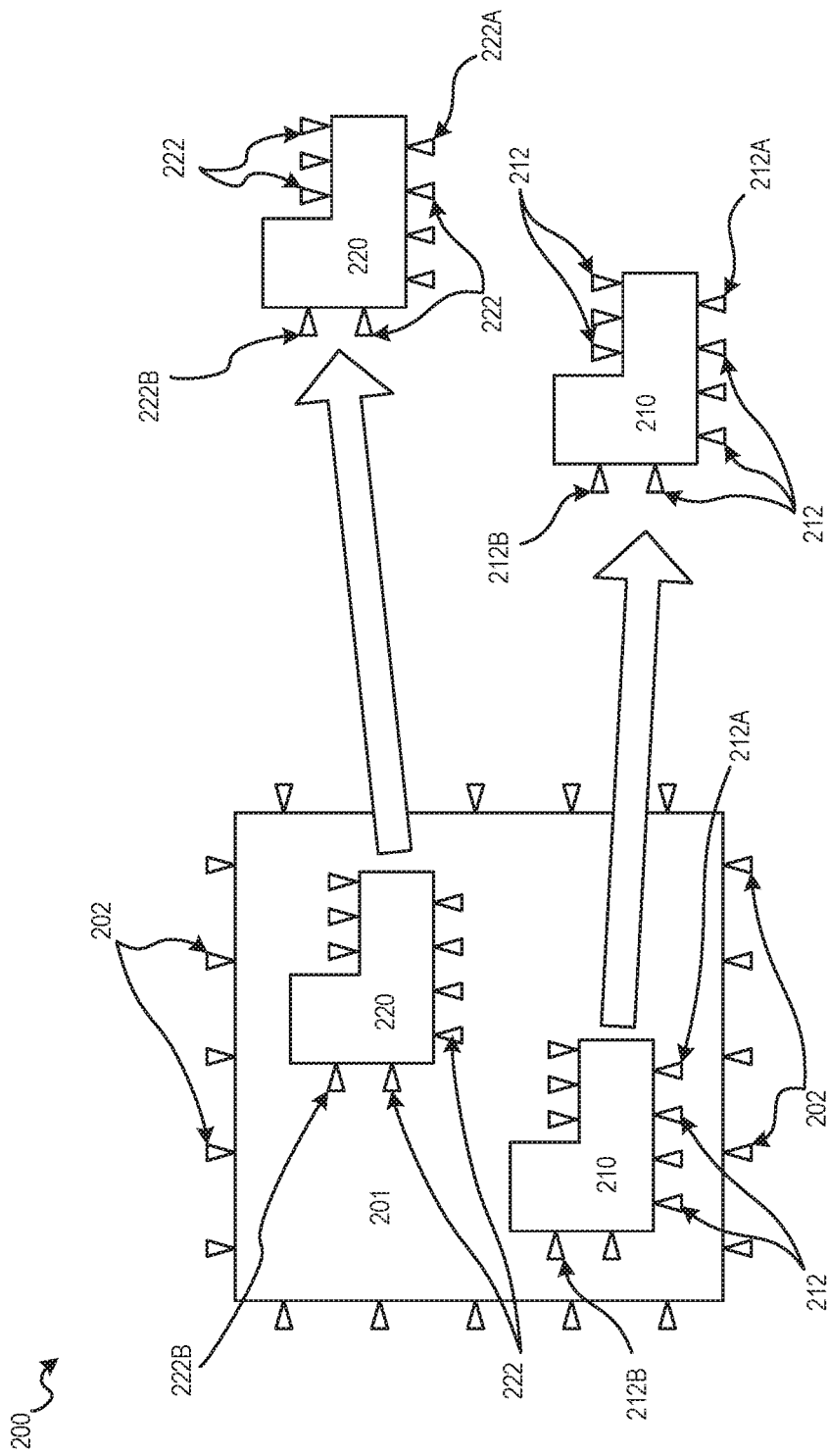
FIG. 2 is a diagram illustrating multiple instances of a master-clone block within a circuit.
Figure 3:
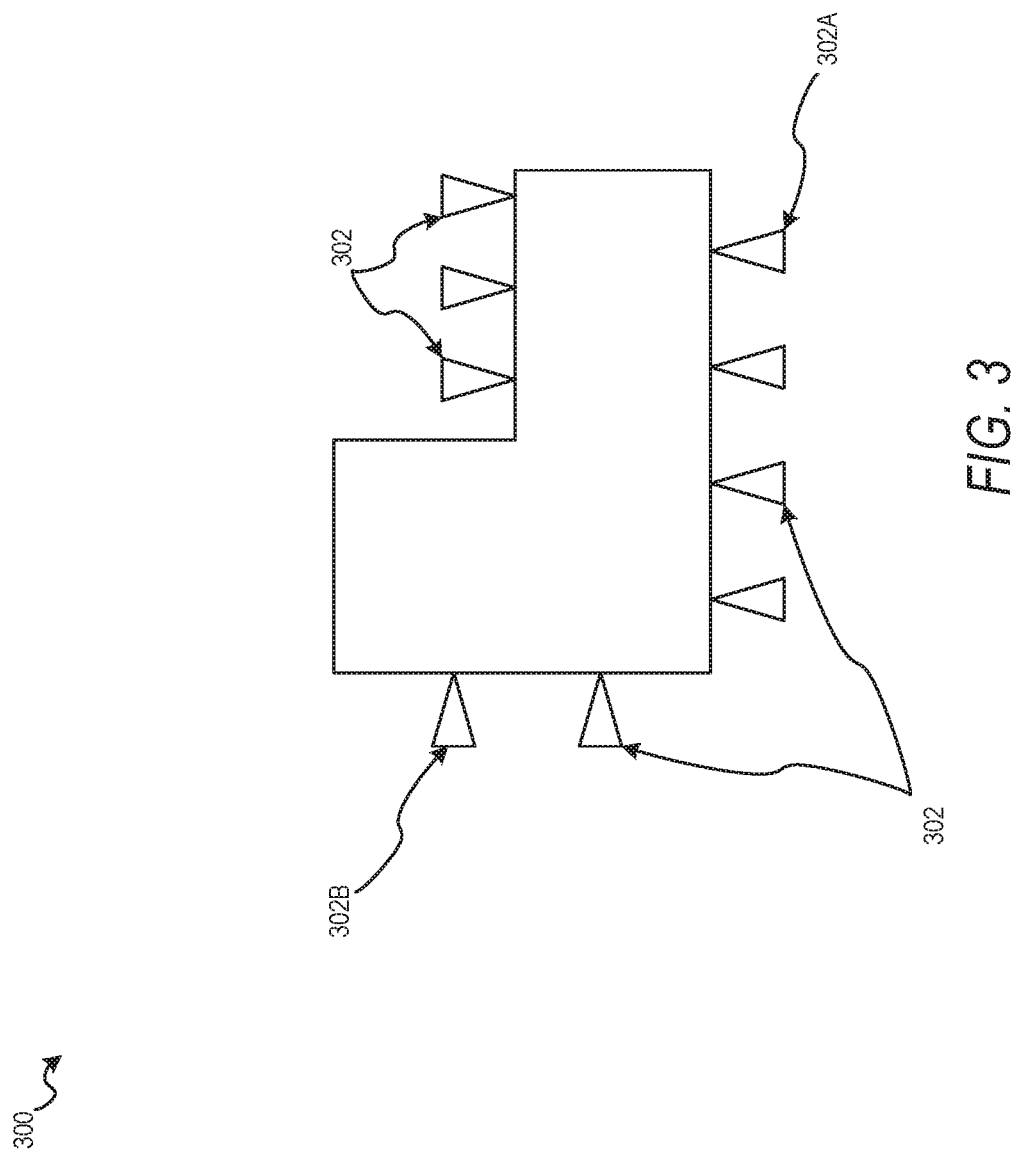
FIG. 3 illustrates a system where a single set of timing constraints are used in timing analysis of a circuit design for all instances of a master-clone block.
Figure 4:
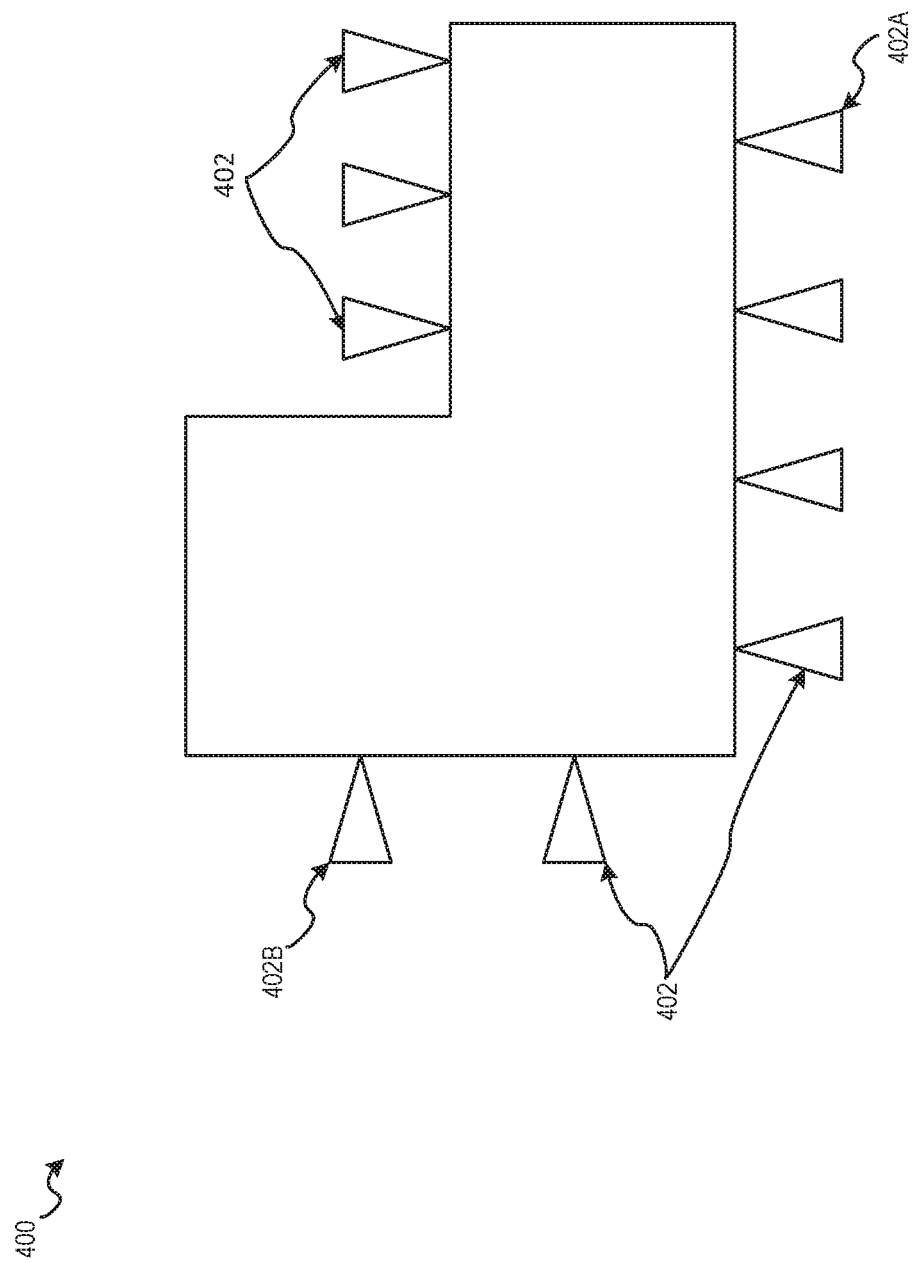
FIG. 4 illustrates aspects of examples where different timing constraints are used for different instances of a master-clone block in a circuit design according to embodiments described herein.

FIGS. 2-4 then illustrate aspects of a circuit design including instances of a master clone block. FIG. 2 is a diagram illustrating multiple instances of a master-clone block within a circuit. In particular, FIG. 2 shows aspects of a circuit design 200 for a circuit 201. Circuit 201 of circuit design 200 includes a first block 210 and a second block 220, which are both instances of a master-clone block having a master block structure. Circuit 201 is shown as including a plurality of pins 202 which are part of the structure of circuit 201 to enable interconnections with other elements of a device. Similarly, first block 210 includes a plurality of pins 212, and second block 220 includes a plurality of pins 222. The structure and placement of the pins 212, 222 for the first block 210 and the second block 220 within each block are the same since the pins 212, 222 may be considered defined by the shared master structure of the master-clone block that first block 210 and second block 220 are instances of. First block 210 and second block 220 each have one or more connections via the pins 212, 222 of the corresponding block to other elements of circuit design 200. For example, in some embodiments, some of pins 212 may be directly connected to pins 202 via conductive signal while, other of pins 212 may be connected to pins 222 via other signal lines. Similarly, in some embodiments, other of pins 212 may be connected to other circuit elements that are not specifically shown. In some embodiments, certain pins of an instance may not be connected to anything or may simply be connected to a ground.

A timing analysis for circuit 201 then tracks the timing of how signals move within circuit 201. As mentioned above, a flat timing analysis would analyze the exact structure of circuit 201 without using blocks such as first block 210 and second block 220. A hierarchical analysis of timing will track signals along transmission lines to a pin of a block, such as a first pin of first block 210, and then track a resulting signal from a second pin of first block 210. The timing within the first block 210 is determined by timing constrains.

For multi-instantiated blocks, a traditional approach to timing is to use a signal set of timing constraints for all instances of a master-clone block. This leads to trade-offs in optimization quality of results due to the loss of non-trivial constraint features. In some embodiments, a convergence problem is also present when a block is integrated at a top level into a design.

FIG. 3 illustrates a system where a single set of timing constraints are used in timing analysis of a circuit design for all instances of a master-clone block 300. Master-clone block 300 represents the shared structure of instances such as first block 210 and second block 220. Pins 302 of master-clone block 300 correspond to the correspondingly placed pins of a particular instance. For example, pin 302A corresponds to pin 212A and pin 222A. Although the internal structure of first block 210, second block 220, and master-clone block 300 is the same shared master structure, the timing associated with pin 212A and 222A may be different due to the different elements of circuit 201 connected to the different pins. In a traditional merged design constraint associated with master-clone block 300, the worst case timing constraint for each instance is identified. For example, if pin 212A is identified as associated with a worse timing constraint than pin 222A, then the timing constraint for pin 212A will be used in a timing constraint file for master-clone block 300 as associated with pin 302A. During a timing analysis, the timing constraint for 302A will then be used for that corresponding pin of each instance of master-clone block 300. Thus, the timing constraint from pin 212A will be used for pin 222A, even though pin 222A actually has a better timing constraint profile. This simplifies the timing calculations, but uses a worst case that prevents non-function of the circuit 201 but degrades performance.

In some situations, such as where a set case analysis is used, a set_false_path is used, or a set multicycle path is used for a pin, the merging described above cannot be performed due to different pins having conflicting timing constraints that do not overlap. For example, if pin 302B is associated with a multicycle path or a set_false_path, such that constraints for associated pins 212B and 222B do not necessarily have overlapping timing constraints that can be selected, the traditional merged constraint for all instances of master-clone block 300 does not work. Similarly, if the possible constraint range for pin 212B does not overlap with a possible constraint range for pin 222B, there is no way to merge the constraints to select a worst-case constraint for pin 302B of master-clone block 300.

Embodiments herein thus may use a different set of timing constraints for each block instance of a master-clone block. During analysis and/or optimization such as optimization operation 111, the different constraints for each instance may be considered different modes for the master-clone block that can be processed concurrently during optimization. In certain implementations, this increases complexity in processing different modes, but may be structured to achieve better quality of results with acceptable convergence of the optimization.

FIG. 4 illustrates aspects of examples where different timing constraints are used for different instances of a master-clone block 400 in a circuit design according to embodiments described herein. Master-clone block 400 includes the same structure for pins 402. Rather than a single set of constraints for master-clone block 400 that is propagated to all instances such as first block 210 and second block 220, in this example, each block is associated with a different mode of master-clone block 400. Pin 402A may thus be associated with a first constraint from pin 212A in a first mode and a second constraint from pin 222A in a second mode. During optimization operations, these separate modes may be processed simultaneously to avoid excessive delay from the extra complexity of considering separate constraints for each instance of the master-clone block 400. For pin 402B associated with pins 212B and 222B, where the constraints are mutually exclusive in a way that would prevent merging, the separate modes allow timing analysis with no convergence issue.

Figure 5:
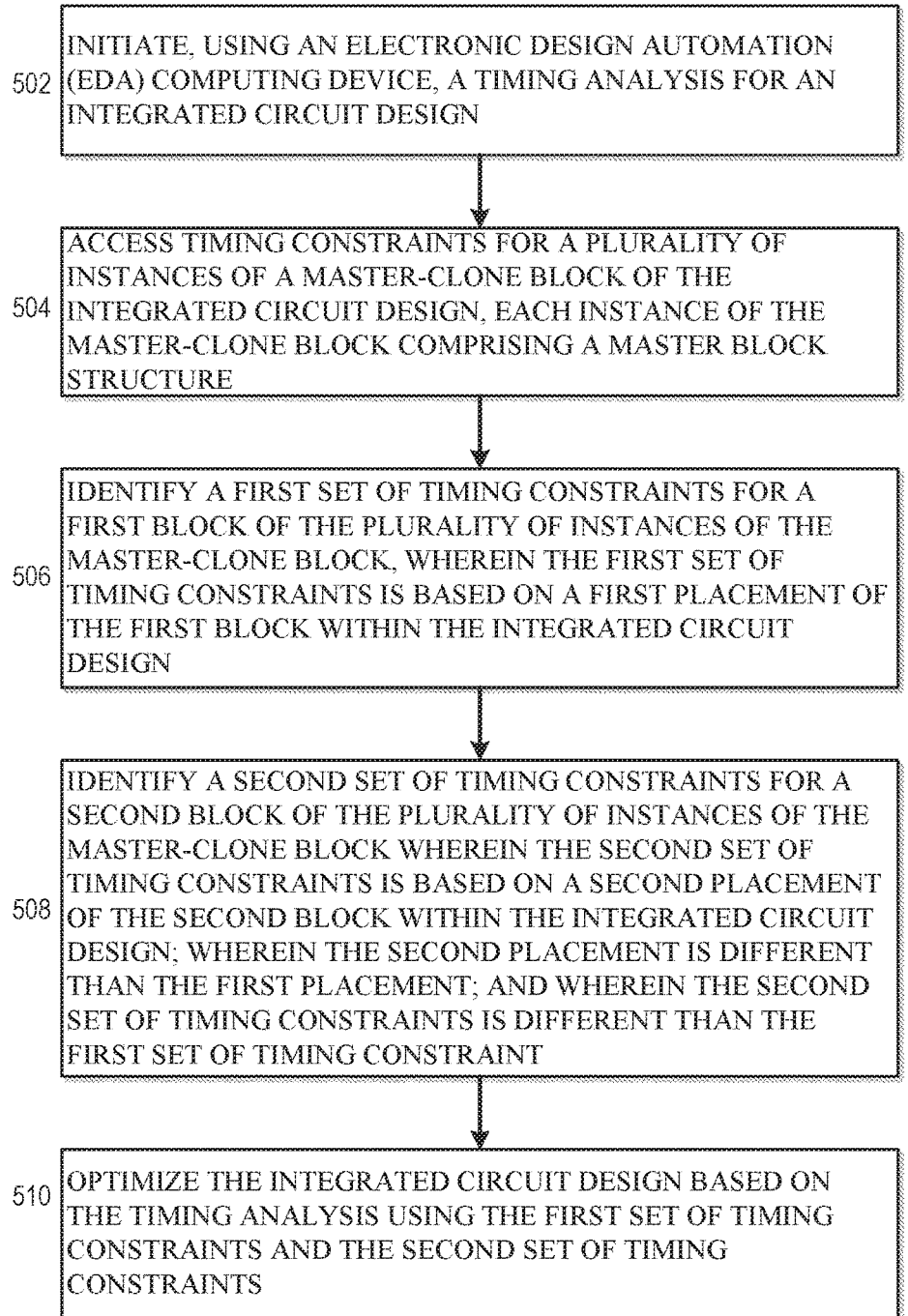
FIG. 5 is an example method for meeting concurrent timing constraints for multi-instantiated block optimization according to some example embodiments.

FIG. 5 is an example method 500 for meeting concurrent timing constraints for multi-instantiated block optimization according to some example embodiments. Method 500 may be implemented using a hardware processor operating on an EDA computing device such as machine 900. In other embodiments, method 500 may be reflected in computer-readable instructions stored in a memory such as memory 930. The instructions, when executed by one or more processors such as processors 910, cause a device running an EDA environment to perform method 500.

Method 500 begins with operation 502 initiating, using an electronic design automation (EDA) computing device, a timing analysis for an integrated circuit design. As described above with respect to FIG. 1, the timing analysis may be performed during RTL logic synthesis, before routing, after routing, during a final optimization check, or at any other time during the process of generating and revising the integrated circuit design.

Timing constraints for a plurality of instances of a master-clone block of the integrated circuit design are accessed during operation 504. The accessed constraints are for instances of the master-clone block comprising a master block structure. In some embodiments, multiple different master-clone blocks may be used in a single integrated circuit design. In such embodiments, various clone instances for a particular master-clone block each have separate timing constraints. In some embodiments, these timing constraints may be structured as part of SDC files. In other embodiments, other file formats may be used to represent the timing constraints for each instance. In some embodiments, the timing constraints are accessed using viewdefinition files, where a viewdefinition file for a master-clone block references an SDC file for each instance of the master-clone block. During the timing analysis initiated in operation 502, the viewdefinition file will be used by a processor to perform operation 504.

A first set of timing constraints for a first block of the plurality of instances of the master-clone block is then identified in operation 506. When the timing constraints are identified as an SDC file within a viewdefinition file, operation 506 involves accessing a particular SDC file for the first block based on a reference within the viewdefinition file. Additionally, an SDC file may include additional constraints or information about a block or circuit design other than timing constraint information. In some embodiments, operation 506 involves selecting the appropriate timing constraint information from an SDC file or another file that includes the timing constraint data with other information. The first set of timing constraints is based on a first placement of the first block within the integrated circuit design. As mentioned above, this means that the timing constraint information for a particular instance is based on the connections between the instance and elements of the circuit design outside of the instance.

Operation 508 then involves identifying a second set of timing constraints for a second block of the plurality of instances of the master-clone block similarly to operation 506 above, but for a second instance of the master-clone block. The second set of timing constraints is based on a second placement of the second block within the integrated circuit design. The second placement is different than the first placement, and the second set of timing constraints is different than the first set of timing constraints. Although method 500 describes a method using two blocks which are instances of a master-clone block, in various embodiments, hundreds or thousands of instances of a single master-clone block may be used in a single integrated circuit design. In some such embodiments, some instances of a master-clone block may have timing constraints similar enough to estimate the timing constraints as the same, and thus use the same set of timing constraints for some, but not all, of the instances of a master-clone block. In other embodiments each instance of a master-clone block uses a different set of timing constraints.

The timing analysis is then performed, with operation 510 including optimizing the integrated circuit design based on the timing analysis using the first set of timing constraints and the second set of timing constraints. As shown by design flow 100, in some embodiments, operations of method 500 or similar operations may be repeated for a single circuit design, not only at different stages of the circuit design, but at the same stage (e.g., RTL synthesis) that is repeated as changes are made to the circuit design.

As discussed above with respect to operation 506, in some embodiments, different instances of a master-clone block may be analyzed as different modes of the master-clone block. These different modes may be identified by a file that is executed as part of a hierarchical top-down budget flow timing analysis of an integrated circuit design. In some embodiments, such a file may be a Cadence® viewdefinition file. An example of such a file for a circuit having three instances [eco_inst; eco_inst1, and eco_inst2] of a first master-clone block [hier_dime3bus] is below. The illustrated example below includes three setup modes and three hold modes, each defined to correspond to an SDC file containing constraints based on the connections of the particular instance within a circuit design.

create_constraint_mode-name   default_constraint_mode_eco_inst\-sdc_files         hier_time3bus.eco_inst/hier_time3bus_default_analysis_view_hold.constr.pt
 create_analysis_view-name default_analysis_view_hold_eco_inst-delay_corner default_delay_corner_min-constraint_mode default_constraint_mode_eco_inst
 create_constraint_mode-name   default_constraint_mode_default_analysis_view_setup_eco_inst\-sdc_files hier_time3bus.eco_inst/hier_time3bus_default_analysis_view_setup.constr.pt
 create_analysis_view-name default_analysis_view_setup_eco_inst-delay_corner  default_delay_corner_max-constraint_mode   default_constraint_mode_default_analysis_view_setup_eco_inst
 create_constraint_mode-name   default_constraint_mode_eco_inst2\-sdc_files        hier_time3bus.eco_inst2/hier_time3bus_default_analysis_view_hold.constr.pt
 create_analysis_view-name default_analysis_view_hold_eco_inst2-delay_corner    default_delay_corner_min-constraint_mode default_constraint_mode_eco_inst2
 create_constraint_mode-name   default_constraint_mode_default_analysis_view_setup_eco_inst2\-sdc_files hier_time3bus.eco_inst2/hier_time3bus_default_analysis_view_setup.constr.pt
 create_analysis_view-name default_analysis_view_setup_eco_inst2-delay_corner default_delay_corner_max-constraint_mode   default_constraint_mode_default_analysis_view_setup_eco_inst2
 create_constraint_mode-name   default_constraint_mode_eco_inst1\-sdc_files        hier_time3bus.eco_inst1/hier_time3bus_default_analysis_view_hold.constr.pt
 create_analysis_view-name default_analysis_view_hold_eco_inst1-delay_corner    default_delay_corner_min-constraint_mode default_constraint_mode_eco_inst1
 create_constraint_mode-name   default_constraint_mode_default_analysis_view_setup_eco_inst1\-sdc_files hier_time3bus.eco_inst1/hier_time3bus_default_analysis_view_setup.constr.pt
 create_analysis_view-name default_analysis_view_setup_eco_inst1-delay_corner default_delay_corner_max-constraint_mode   default_constraint_mode_default_analysis_view_setup_eco_inst1
 set_analysis_view-setup [list default_analysis_view_setup_eco_inst default_analysis_view_setup_eco_inst2 default_analysis_view_setup_eco_inst1]-hold [list default_analysis_view_hold_eco_inst default_analysis_view_hold_eco_inst2 default_analysis_view_hold_eco_inst1]

In the above example, only one of the three instances, eco_inst, has a constant definition [set_case_analysis 0 [get_ports {datain[2])}]. This means that only the pin for datain[2] on eco_inst is connected to "0" at a top level, while the same pin on eco_inst1 and eco_inst2 are connected to regular paths. This is a particular example of the situation described above where the constraints for a particular pin of a master-clone block have mutually exclusive constraints. In this example, a merged constraint file for all instances of the master-clone block would fail to converge due to the differences in the constraints. While the above example is presented in a particular example viewdefinition format, other formats and structures to manage different timing constraints for different instances of the same master-clone block may be used in accordance with the embodiments described herein.

Figure 6:
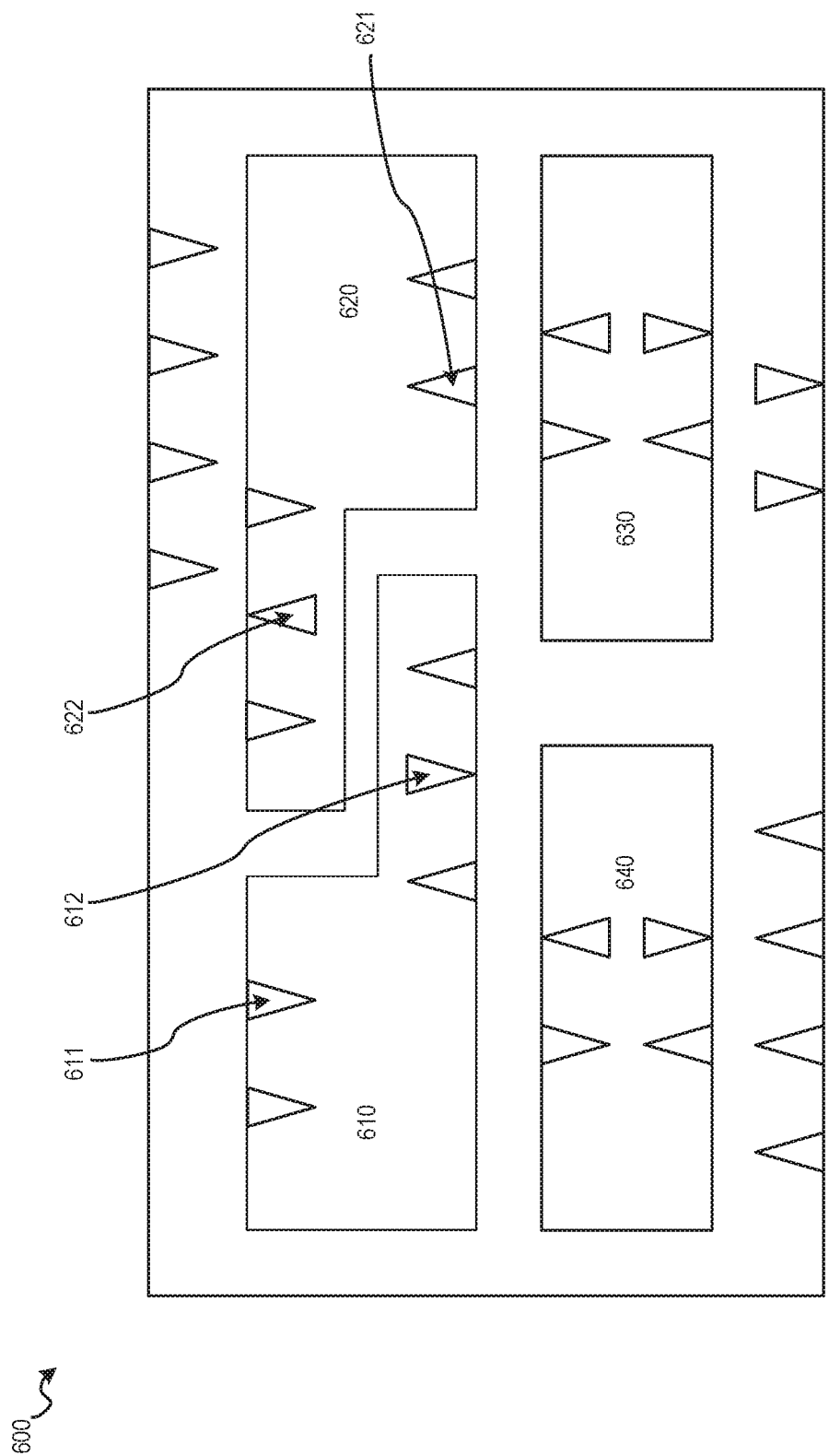
FIG. 6 illustrates aspects of an example circuit with two instances of a master clone block having different timing constraints according to some embodiments described herein.

FIG. 6 illustrates aspects of an example circuit 601 with two instances 610, 620 of a master clone block having different timing constraints according to some embodiments described herein. The circuit 601 within circuit design 600 also includes a second set of instances 630, 640 of a second master-clone block different than the master-clone block associated with instances 610, 620. As discussed above, the different placement of instance 610 and instance 620 within the circuit design 600 results in the surrounding elements of the circuit 601 for each instance being different. These differences result in different timing constraints for each instance.

Some embodiments may include generation of timing constraints (e.g., generation of an SDC file or another such constraint file or set of constraints). For example, some embodiments of method 500 above, when applied to circuit design 600, may further include operations for generating the first set of timing constraints based on the placement of a first block for instance 610 within the integrated circuit design 600 as well as generating the second set of timing constraints based on the placement of the second block for instance 620 within the integrated circuit design 600. The first set of timing constraints and the second set of timing constraints may be stored in a memory of the EDA computing device as separate files (e.g., separate SDC files or other constraint files).

In some embodiments, generating the first set of timing constraints and the second set of timing constraints includes calculating constraint values for each of a first plurality of pins of the first block and calculating constraint values for each of a second plurality of pins of the second block, where a pin structure of the master structure describes the first plurality of pins and the second plurality of pins. This may be seen, for example, with the pin structure of master-clone block 400 compared with blocks 210 and 220.

In some embodiments, generating the first set of timing constraints and the second set of timing constraints further comprises calculating the constraint values for each pin of the first plurality of pins based on the master structure and a first set of elements of the integrated circuit design coupled to the first plurality of pins as described by the integrated circuit design. The constraint values for each pin of the second plurality of pins is calculated based on the master structure and a second set of elements of the integrated circuit design coupled to the second plurality of pins as described by the integrated circuit design.

In such embodiments, calculating constraint values for each of the first plurality of pins of the first block may comprise calculating constraints for each pair of pins of an instance using details of the surrounding elements of the circuit design as well as the master structure of the block. This may involve operations including identifying a first pin of the first plurality of pins associated with a first pin of the master structure and identifying a second pin of the first plurality of pins associated with a second pin of the master structure, along with identification of first circuit elements of the integrated circuit design coupled to the first pin and identifying second circuit elements of the integrated circuit design coupled to the second pin. For example, in FIG. 6, pin 611 may be coupled to block instance 640 and pin 612 may be coupled to block instance 630. A first timing constraint for the first pin and the second pin of the first plurality of pins may be calculated based on the first circuit elements of the integrated circuit design, the second circuit elements of the integrated circuit design, and elements of the master structure connecting the first pin and the second pin of the first plurality of pins. A corresponding calculation may be performed for the similar pins 621 and 622 in the second instance 620 that shares the same master-clone block and master structure as instance 610. Even though these pins share the same position within the shared master structure as pins 611 and 612, the different placement and connection results in different timing constraints.

For example, as described above, in some embodiments, a pin such as pin 611 may not be connected to anything, or may be connected to ground. In such an embodiment, the first circuit elements connected to pin 611 of instance 610 may be identified a null set, or a "0". The corresponding pin 621 of instance 620 may be connected to different circuit elements associated with a particular load value used to determine a timing constraint for instance 620 that is different than the constraint for the corresponding pin of instance 610.

Figure 7:
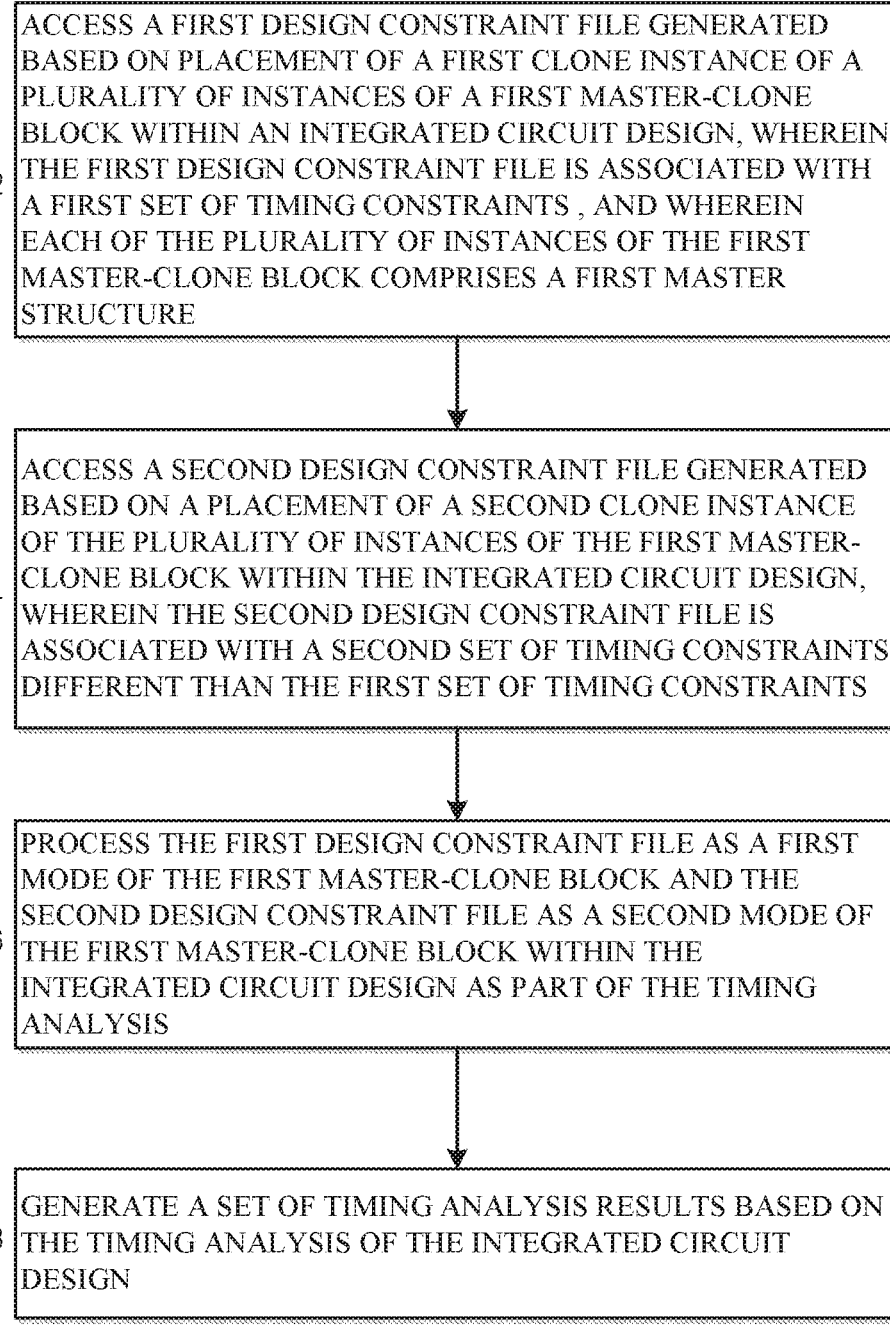
FIG. 7 is an example method for meeting concurrent timing constraints for multi-instantiated block optimization according to some example embodiments.

FIG. 7 is an example method 700 for meeting concurrent timing constraints for multi-instantiated block optimization according to some example embodiments. In various embodiments, method 700 may be implemented as described above for method 500, or in any other such acceptable implementation for the operations of method 700.

In various embodiments, after the design constraint files are generated, either through inputs to an EDA computing device from a designer or using calculations on a design of a process flow, method 700 begins with operation 702 to access a first design constraint file generated based on placement of a first clone instance of a plurality of instances of a first master-clone block within an integrated circuit design, wherein the first design constraint file is associated with a first set of timing constraints, and wherein each of the plurality of instances of the first master-clone block comprises a first master structure. A second design constraint file generated based on a placement of a second clone instance of the plurality of instances of the first master-clone block within the integrated circuit design may be accessed before, after, or while the first file is accessed, as part of operation 704. The second design constraint file is associated with a second set of timing constraints different from the first set of timing constraints. The EDA computing device then processes the first design constraint file as a first mode of the first master-clone block and the second design constraint file as a second mode of the first master-clone block within the integrated circuit design as part of the timing analysis of operation 706. These modes may, in some embodiments, be processed in parallel, thus preventing the extra calculations associated with the separate constraints from consuming significant resources. In some embodiments, the calculations consume the same or similar processing resources as calculations using the same constraints for all instances of a master-clone block. After this processing is complete, in operation 708, a set of timing analysis results are generated based on the timing analysis of the integrated circuit design. These results may be presented to a designer on an output of the EDA computing device, or the results may be used by the EDA computing device to automatically adjust elements of a circuit design based on the results of the timing analysis. In some embodiments, the adjustments may be presented to a designer for approval on a display of the EDA computing device.

Figure 8:
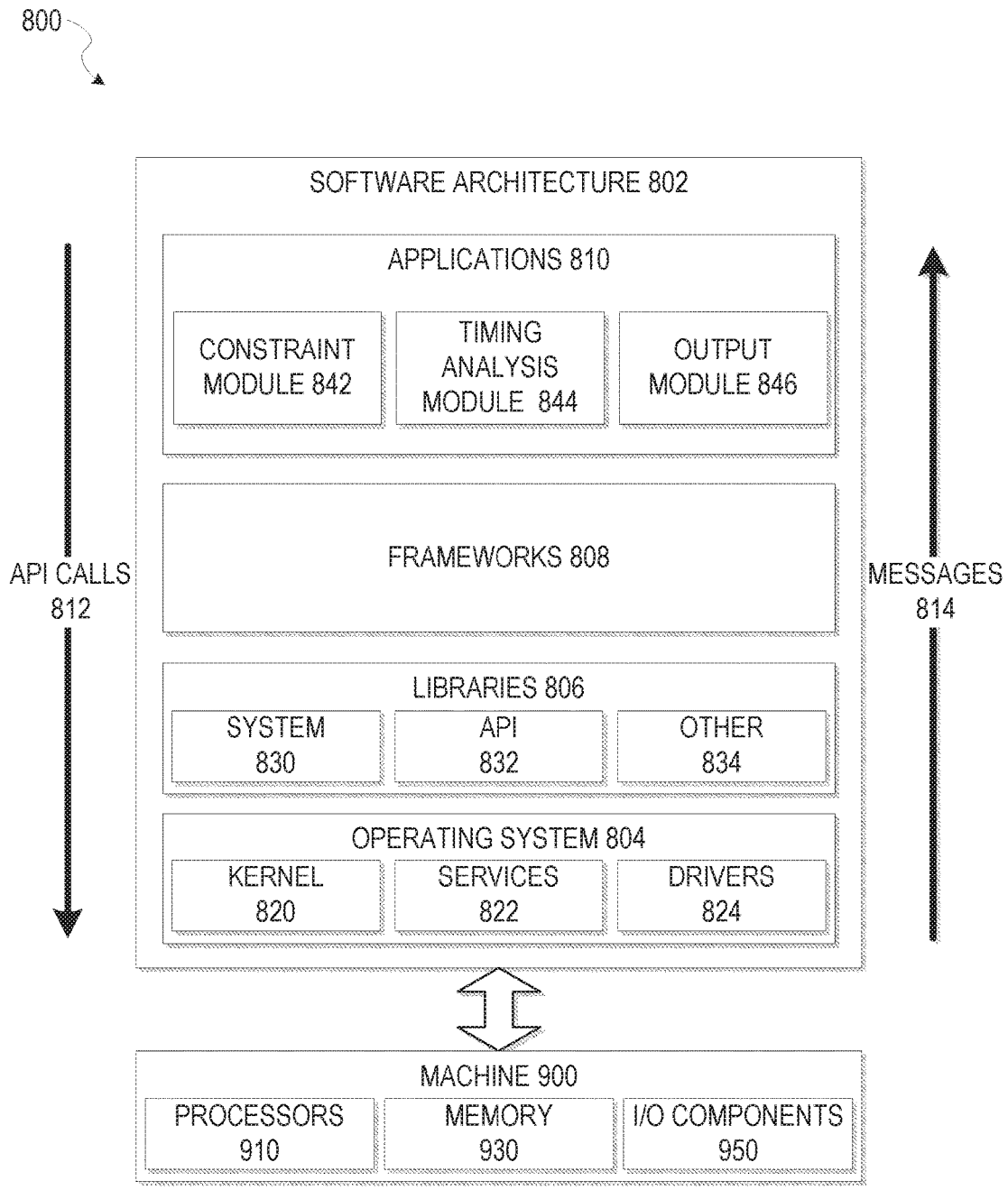
FIG. 8 is a block diagram illustrating an example of a software architecture that may be operating on an electronic design automation (EDA) computer and used with methods for meeting concurrent timing constraints for multi-instantiated block optimization according to some example embodiments.

FIG. 8 is a block diagram 800 illustrating an example of a software architecture 802 that may be operating on an electronic design automation (EDA) computer and used with methods for meeting concurrent timing constraints for multi-instantiated block optimization according to some example embodiments. FIG. 8 shows is a block diagram illustrating a software architecture 802, which can be used as an electronic design automation computing device to implement any of the methods described above. Aspects of software architecture 802 may, in various embodiments, be used to store circuit designs and execute timing analysis or optimization in an EDA environment to generate circuit designs, with physical devices generated using these circuit designs.

FIG. 8 is merely a non-limiting example of a software architecture 802, and it will be appreciated that many other architectures can be implemented to facilitate the functionality described herein. In various embodiments, the software architecture 802 is implemented by hardware such as machine 900 of FIG. 9 that includes processors 910, memory 930, and I/O components 950. In this example, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke application programming interface (API) calls 812 through the software stack and receive messages 814 in response to the API calls 812, consistent with some embodiments. In various embodiments, any client device, server computer of a server system, or any other device described herein may operate using elements of software architecture 802. An EDA computing device described herein may additionally be implemented using aspects of the software architecture 802, with the architecture 802 adapted for operating to perform multi-instance timing analysis in any manner described herein.

In one embodiment, an EDA application of applications 810 performs multi-instance timing optimization according to embodiments described herein using various modules within software architecture 802. For example, in one embodiment, an electric design automation (EDA) computing device similar to machine 900 includes memory 930 and one or more processors 910. The processors 910 implement constraint module 842 to generate a first design constraint file based on placement of a first clone instance of a master-clone block within an integrated circuit design. The first design constraint file is associated with a first set of timing constraints, and each instance of the master-clone block consists of a first structure. Constraint module 842 also generates a second design constraint file based on placement of a second clone instance of the master-clone block within the integrated circuit design, wherein the second design constraint file is associated with a second set of timing constraints different from the first set of timing constraints.

The processors also implement timing analysis module 844 to process the first design constraint file as a first mode of the master-clone block and the second design constraint file as a second mode of the master-clone block within the integrated circuit design as part of the timing analysis, and generate a set of timing analysis results or a set of timing constraint results based on the timing analysis of the integrated circuit design.

Processor implemented output module 846 may then be used to update a display of I/O components 950 of the EDA computing device with data associated with the set of timing analysis results.

In various other embodiments, rather than being implemented as modules of one or more applications, some or all of modules 842, 844, and 846 may be implemented using elements of libraries 806 or operating system 804.

In various implementations, the operating system 804 manages hardware resources and provides common services. The operating system 804 includes, for example, a kernel 820, services 822, and drivers 824. The kernel 820 acts as an abstraction layer between the hardware and the other software layers consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, signal processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 806 provide a low-level common infrastructure utilized by the applications 810. The libraries 806 can include system libraries 830 such as libraries of master-clone blocks for use in an EDA environment or other libraries that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 806 may also include other libraries 834.

The software frameworks 808 provide a high-level common infrastructure that can be utilized by the applications 810, according to some embodiments. For example, the software frameworks 808 provide various graphic user interface (GUI) functions, high-level resource management, high-level location services, and so forth. The software frameworks 808 can provide a broad spectrum of other APIs that can be utilized by the applications 810, some of which may be specific to a particular operating system or platform. In various embodiments, the systems, methods, devices, and instructions described herein may use various files, macros, libraries, and other elements of an EDA design environment to implement analysis described herein. This includes top-down budget flow timing analysis of an integrated circuit design, along with any element of hierarchical analysis that may be used as part of or along with the embodiments described herein. While SDC files and viewdefinition files are examples that may operate within a software architecture 802, it will be apparent that other files and structures may provide a similar function in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Figure 9:
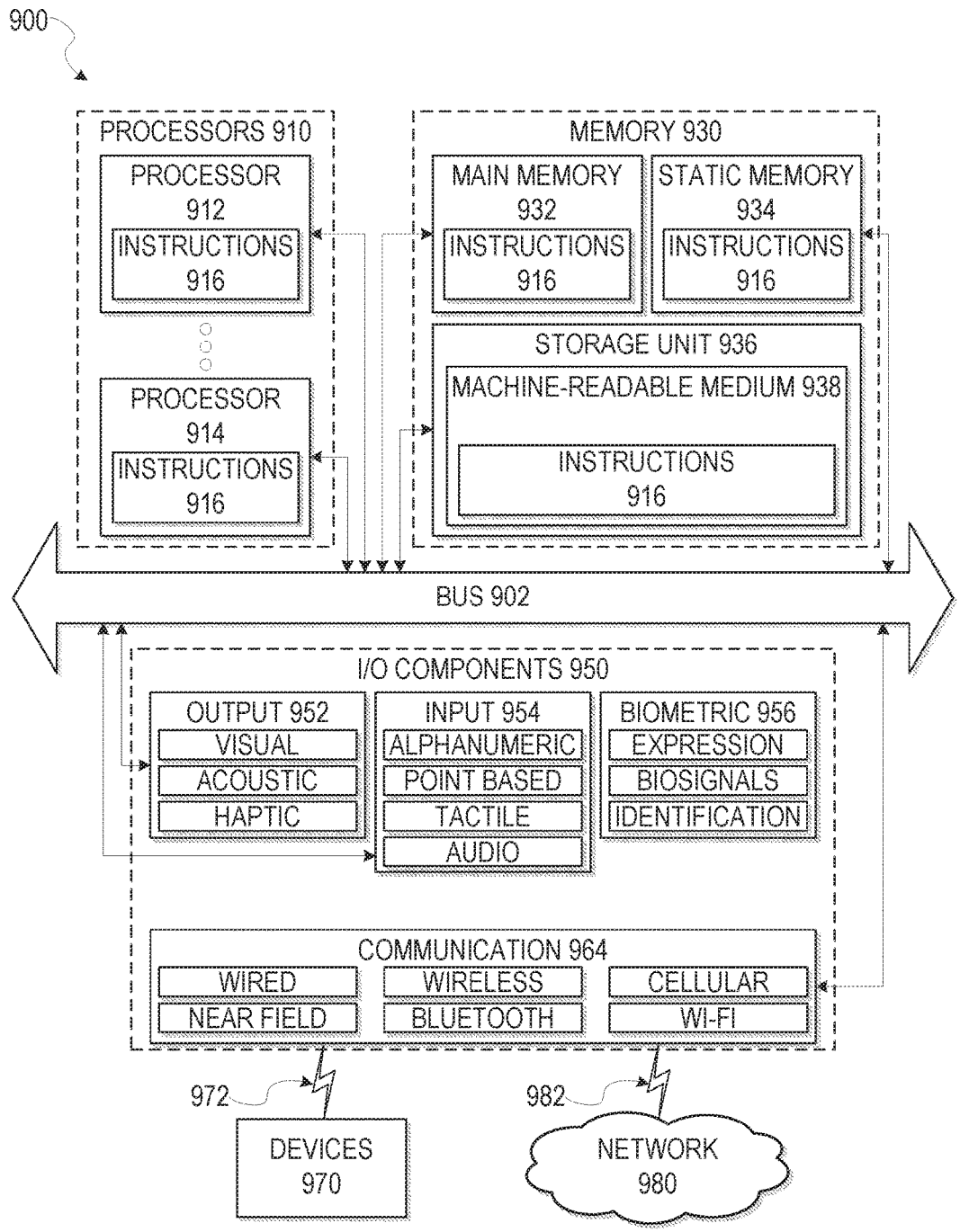
FIG. 9 is a diagrammatic representation of a machine in the form of a computer system within which a set of instructions may be executed for causing the machine to perform any one or more of the methodologies discussed herein, according to an example embodiment.

FIG. 9 is a diagrammatic representation of the machine 900 in the form of a computer system within which a set of instructions may be executed for causing the machine 900 to perform any one or more of the methodologies discussed herein, according to an example embodiment. FIG. 9 shows components of the machine 900, which is, according to some embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a set-top box (STB), a personal digital assistant (PDA), a media system, a cellular telephone, a smart phone, a mobile device, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

In various embodiments, the machine 900 comprises processors 910, memory 930, and I/O components 950, which can be configured to communicate with each other via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 912 and a processor 914 that may execute the instructions 916. The term "processor" is intended to include multi-core processors that may comprise two or more independent processors (also referred to as "cores") that can execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any one or more of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown in an example embodiment to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 9. The I/O components 950 are grouped according to functionality merely for simplifying the following discussion, and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 950 include biometric components 956 among a wide array of other components.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, communication components 964 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 970 may be another machine or any of a wide variety of peripheral devices (e.g., a peripheral device coupled via a Universal Serial Bus (USB)).

Transmission Medium

In various example embodiments, one or more portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-speed Packet Access (HSPA), Worldwide Interoperability for Microwave Access (WiMAX), Long Term Evolution (LTE) standard, others defined by various standard-setting organizations, other long range protocols, or other data transfer technology.

Furthermore, the machine-readable medium 938 is non-transitory (in other words, not having any transitory signals) in that it does not embody a propagating signal. However, labeling the machine-readable medium 938 "non-transitory" should not be construed to mean that the medium 938 is incapable of movement; the medium 938 should be considered as being transportable from one physical location to another. Additionally, since the machine-readable medium 938 is tangible, the medium 938 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, techniques, instruction sequences, and computing machine program products that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
    initiating, using one or more processors of an electronic design automation (EDA) computing device, a timing analysis for an integrated circuit design;
    accessing, by the one or more processors, timing constraints for a plurality of instances of a master-clone block of the integrated circuit design, each instance of the master-clone block comprising a master block structure;
    identifying, by the one or more processors, a first set of timing constraints for a first block of the plurality of instances of the master-clone block, wherein the first set of timing constraints is based on a first placement of the first block within the integrated circuit design;
    identifying, by the one or more processors, a second set of timing constraints for a second block of the plurality of instances of the master-clone block; and
    optimizing, by the one or more processors, the integrated circuit design based on the timing analysis using the first set of timing constraints and the second set of timing constraints.

2. The method of claim 1 wherein the second set of timing constraints is based on a second placement of the second block within the integrated circuit design, wherein the second placement is different than the first placement, and wherein the second set of timing constraints is different than the first set of timing constraints.

3. The method of claim 2 further comprising:
    generating the first set of timing constraints based on the first placement of the first block within the integrated circuit design;
    storing the first set of timing constraints in a memory of the EDA computing device;
    generating the second set of timing constraints based on the second placement of the second block within the integrated circuit design; and
    storing the second set of timing constraints in the memory of the EDA computing device.

4. The method of claim 3 wherein the first set of timing constraints is stored in the memory as a first SDC (Synopsys Design Constraint) file, and
    wherein the second set of timing constraints is stored in the memory as a second SDC file separate from the first SDC file.

5. The method of claim 3 wherein generating the first set of timing constraints and the second set of timing constraints comprises:
    calculating constraint values for each of a first plurality of pins of the first block; and
    calculating constraint values for each of a second plurality of pins of the second block,
    wherein a pin structure of the master block structure describes the first plurality of pins and the second plurality of pins.

6. The method of claim 5 wherein generating the first set of timing constraints and the second set of timing constraints further comprises:
    calculating the constraint values for each pin of the first plurality of pins based on the master block structure and a first set of elements of the integrated circuit design coupled to the first plurality of pins as described by the integrated circuit design; and
    calculating the constraint values for each pin of the second plurality of pins based on the master block structure and a second set of elements of the integrated circuit design coupled to the second plurality of pins as described by the integrated circuit design.

7. The method of claim 5 wherein calculating constraint values for each of the first plurality of pins of the first block comprises:
    identifying a first pin of the first plurality of pins associated with a first pin of the master block structure;
    identifying a second pin of the first plurality of pins associated with a second pin of the master block structure;
    identifying first circuit elements of the integrated circuit design coupled to the first pin;
    identifying second circuit elements of the integrated circuit design coupled to the second pin; and
    calculating a first timing constraint for the first pin and the second pin of the first plurality of pins based on the first circuit elements of the integrated circuit design, the second circuit elements of the integrated circuit design, and elements of the master block structure connecting the first pin and the second pin of the first plurality of pins,
    wherein calculating constraint values for each of the second plurality of pins of the second block comprises:
        identifying a first pin of the second plurality of pins associated with a first pin of the master block structure;
        identifying a second pin of the second plurality of pins associated with a second pin of the master block structure;
        identifying third circuit elements of the integrated circuit design coupled to the first pin;
        identifying fourth circuit elements of the integrated circuit design coupled to the second pin; and
        calculating a second timing constraint for the first pin and the second pin of the second plurality of pins based on the third circuit elements of the integrated circuit design, the fourth circuit elements of the integrated circuit design, and the elements of the master block structure connecting the first pin and the second pin of the second plurality of pins.

8. The method of claim 7 wherein the first circuit elements are identified as a null set indicating that the first pin of the first plurality of pins is not connected to any elements of the integrated circuit design outside of the second block, wherein the third circuit elements are associated with a particular load value used to determine the second timing constraint.

9. The method of claim 4 further comprising:
initiating, at the EDA computing device, a top-down budget flow timing analysis of the integrated circuit design;
generating the first SDC file and the second SDC file as part of the top-down budget flow timing analysis of the integrated circuit design; and
generating a timing analysis report as part of the optimizing of the integrated circuit design.

10. The method of claim 9 wherein the timing analysis report is generated during register transfer level logic synthesis for the integrated circuit design.

11. The method of claim 9 wherein the timing analysis report is generated as part of optimizing the integrated circuit design based on the timing analysis prior to generation of routing lines for the integrated circuit design.

12. The method of claim 9 wherein the timing analysis report is generated as part of optimizing the integrated circuit design based on the timing analysis following generation of routing lines for the integrated circuit design.

13. The method of claim 10 further comprising fabricating a plurality of integrated circuits from the integrated circuit design including the first block and the second block as modified by the optimizing of the integrated circuit design based on the timing analysis.

14. An electric design automation (EDA) computing device comprising:
a memory;
one or more hardware processors coupled to the memory;
a processor implemented constraint module configured to:
generate a first design constraint file based on placement of a first clone instance of a master-clone block within an integrated circuit design, wherein the first design constraint file is associated with a first set of timing constraints, and wherein each instance of the master-clone block consists of a first structure; and
generate a second design constraint file based on placement of a second clone instance of the master-clone block within the integrated circuit design, wherein the second design constraint file is associated with a second set of timing constraints different than the first set of timing constraints; and
a processor implemented timing analysis module configured to:
process the first design constraint file as a first mode of the master-clone block and the second design constraint file as a second mode of the master-clone block within the integrated circuit design as part of the timing analysis; and
generate a set of timing analysis results based on the timing analysis of the integrated circuit design.

15. The EDA computing device of claim 14 further comprising an output module configured to update a display of the EDA computing device with data associated with the set of timing analysis results.

16. A non-transitory computer-readable medium embodying instructions that, when executed by one or more processors, cause the one or more processors to perform operations comprising:
accessing a first design constraint file generated based on placement of a first clone instance of a plurality of instances of a first master-clone block within an integrated circuit design, wherein the first design constraint file is associated with a first set of timing constraints, and wherein each of the plurality of instances of the first master-clone block comprises a first master block structure;
accessing a second design constraint file generated based on a placement of a second clone instance of the plurality of instances of the first master-clone block within the integrated circuit design, wherein the second design constraint file is associated with a second set of timing constraints different than the first set of timing constraints;
processing the first design constraint file as a first mode of the first master-clone block and the second design constraint file as a second mode of the first master-clone block within the integrated circuit design as part of a timing analysis; and
generating a set of timing analysis results based on the timing analysis of the integrated circuit design.

17. The non-transitory computer-readable medium of claim 16 wherein the instructions are stored within the non-transitory computer readable medium as a Cadence® viewdefinition file.

18. The non-transitory computer-readable medium of claim 17 wherein the first design constraint file is a first SDC (Synopsys Design Constraint) file referenced by the Cadence viewdefinition file, and wherein the second design constraint file is a second SDC file referenced by the Cadence viewdefinition file.

19. The non-transitory computer-readable medium of claim 16 wherein the instructions further cause the one or more processors to perform additional operations comprising:
accessing a third design constraint file generated based on placement of the first clone instance of the plurality of instances of the first master-clone block within the integrated circuit design, wherein the third design constraint file is associated with a third set of timing constraints different from both the first set of timing constraints and the second set of timing constraints; and
processing the third design constraint file as a third mode of the first master-clone block within the integrated circuit design as part of the timing analysis,
wherein the set of timing analysis results is further generated using the processing of the third design constraint file.

20. The non-transitory computer-readable medium of claim 16 wherein the instructions further cause the one or more processors to perform additional operations comprising:
accessing a third design constraint file generated based on placement of a first clone instance of a second plurality of instances of a second master-clone block within the integrated circuit design, wherein the third design constraint file is associated with a third set of timing constraints, and wherein each of the plurality of instances of the second master-clone block comprises a second master block structure;
accessing a fourth design constraint file generated based on placement of a second clone instance of the second plurality of instances of the second master-clone block within the integrated circuit design, wherein the fourth design constraint file is associated with a fourth set of timing constraints different than the third set of timing constraints; and
processing the third design constraint file as a first mode of the second master-clone block and the fourth design constraint file as a second mode of the second master-clone block within the integrated circuit design as part of the timing analysis,
wherein the set of timing analysis results is further based on the processing of the third design constraint file and the fourth design constraint file.

\* \* \* \* \*